United States Patent [19]
McCullagh

[11] Patent Number: 4,911,615
[45] Date of Patent: Mar. 27, 1990

[54] HYDRAULIC PUMP UNLOADER

[75] Inventor: Michael G. McCullagh, Lincoln, England

[73] Assignee: Clayton Dewandre Co., Ltd., Lincoln, England

[21] Appl. No.: 301,155

[22] Filed: Jan. 24, 1989

[30] Foreign Application Priority Data

Jan. 27, 1988 [GB] United Kingdom ............... 8801803

[51] Int. Cl.⁴ .................................................. F04B 49/02
[52] U.S. Cl. ..................................... 417/295; 137/488
[58] Field of Search ................... 417/307, 295, 441; 137/488, 860

[56] References Cited

U.S. PATENT DOCUMENTS

| 2,594,132 | 4/1952 | Dalrymple | 137/508 |
| 3,304,872 | 2/1967 | English | 137/860 |
| 4,371,317 | 2/1983 | Heibel | 417/307 |

FOREIGN PATENT DOCUMENTS

| 882637 | 7/1953 | Fed. Rep. of Germany | 75/50 |
| 883373 | 7/1953 | Fed. Rep. of Germany | 431/212 |
| 1490427 | 7/1967 | France | 24/567 |

Primary Examiner—Michael Koczo
Assistant Examiner—Douglas J. Makosy
Attorney, Agent, or Firm—G. J. Falce

[57] ABSTRACT

An unloader device for controlling the output of a hydraulic pump, for example, in a constant pressure-type motor vehicle braking circuit. Delivery to hydraulic accumulators in the circuit is halted by a resilient seal defining an annulus forming part of the inlet fluid flow path to the pump and to which the pump delivery pressure is applied to expand the seal in the sense to close the annulus, by a valve operable when the delivery pressure reaches a predetermined value.

6 Claims, 2 Drawing Sheets

HYDRAULIC PUMP UNLOADER

BACKGROUND OF THE INVENTION

The invention relates to an unloader, more particularly an unloader for controlling the fluid output of a hydraulic pump in a constant pressure type circuit, particularly as used in power hydraulic braking systems for motor vehicles. In such systems the pump output is used to fill hydraulic accumulators with pressurized fluid which is, in turn, used for operational duties such as applying the brakes under the command of the brake pedal. When the accumulators are filled with pressurized fluid the pump delivery must be temporarily halted or bypassed and when topping up of accumulator fluid is required the delivery must be recommenced. A device for this purpose is called the pump unloader of which there are basically three types:

(a) Stopping rotation of the pump, as by a clutch device if engine driven, or a switch if motor driven, the command device being usually a pressure rather than volume sensor.

(b) Shunting the unwanted fluid delivery back to reservoir via a control valve.

(c) Interrupting fluid delivery by closing the pump inlet or suction port.

U.K. Patent No. A-1 300 278 discloses a typical pump arrangement using an unloader of type c (above). It is a dual output pump, but could clearly be adapted as a single output pump. The unloader means is a pressurized pin (19) urging a plunger (18) against a spring to close port-hole (16) and stop fluid entering the piston/-cylinder assembly (5), which in turn terminates delivery at fitting (11). An alternative construction is shown in U.K. Patent No. A-1485532 in which a pressurized spool (8) cuts-off flow through the center of a cup seal (at 10a).

SUMMARY OF THE INVENTION

One object of the present invention is to provide an improved unloader capable of quieter operation and precise fluid cut-out and cut-in operating points.

According to the present invention, an unloader for a fluid pump is provided having an inlet fluid flow path formed by an annulus between a bore and a resilient seal that is cooperatively arranged with the bore. The unloader is further provided with a valve operable when the delivery pressure reaches a predetermined value, to effect closure of the annulus and thereby interrupt the pump delivery pressure at the seal.

Conveniently, the seal is an annular seal, such as an o-ring seal disposed in a groove surrounding a cylindrical unloader body within a bore housing the unloader body. The o-ring is underfit relative to the bore to define the annulus, the delivery pressure being applied in the groove and acting to expand the o-ring seal radially into contact with the bore. When the delivery pressure is removed, the seal contracts due to its resilience, thus opening the annulus and permitting inlet fluid to flow and load the pump.

In the preferred embodiment, the valve is operable by a plunger responsive to the pump delivery pressure and acting against a bias. It comprises a valve element preferably a ball, cooperating with a first valve seat and movable by the plunger when the delivery pressure reaches a predetermined value, to cooperate with a second valve seat and close a passageway between the inlet fluid flow path and the space behind the seal. As the valve element lifts from the second seat (when the delivery accumulator pressure falls) the delivery pressure acting behind the o-ring seal is dropped to the reservoir pressure effective in the inlet flow path, so allowing the o-ring seal to contract. A predetermined differential between cut-in and cut-out pressures may be obtained by making one seat, the second seat, larger than the other.

Embodiments of the present invention will now be described by way of example, with reference to the accompanying drawings, in which:

DESCRIPTION AND OPERATION

Figure 1:
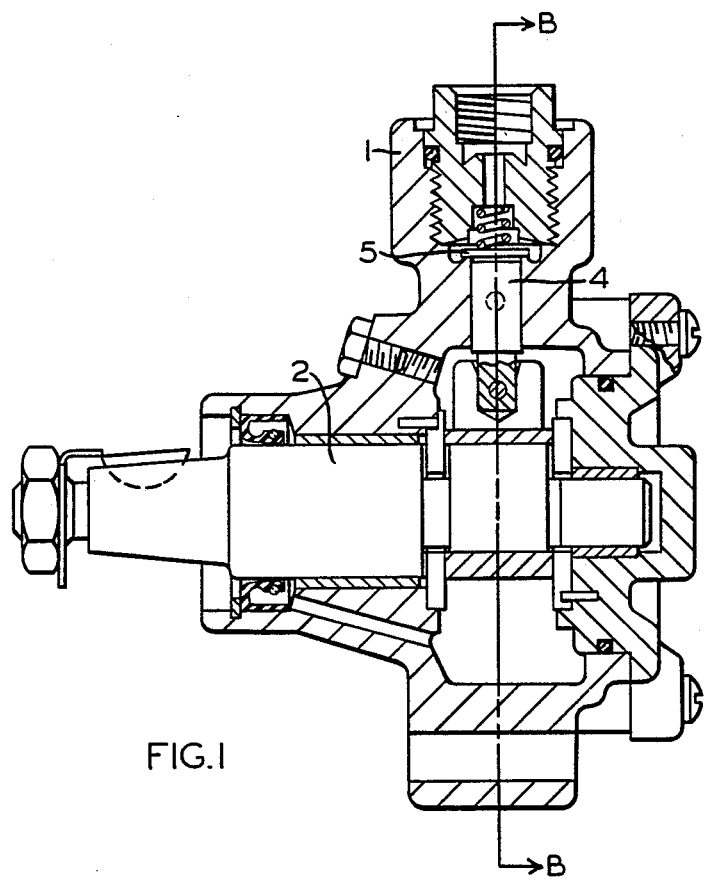
FIG. 1 is an axial section through a hydraulic pump having an unloader according to the present invention.

The pump shown in FIG. 1 is of the same basic construction to that described in U.K. Pat. No. 1 300 278 (the disclosure of which is incorporated herein by reference) consisting of a body 1, a crankshaft 2, a link or connecting rod 3, a piston 4, a delivery valve disc 5, a fluid inlet port 6, a passage 7 leading to the pump crankcase, and an unloader assembly 8.

Figure 2:
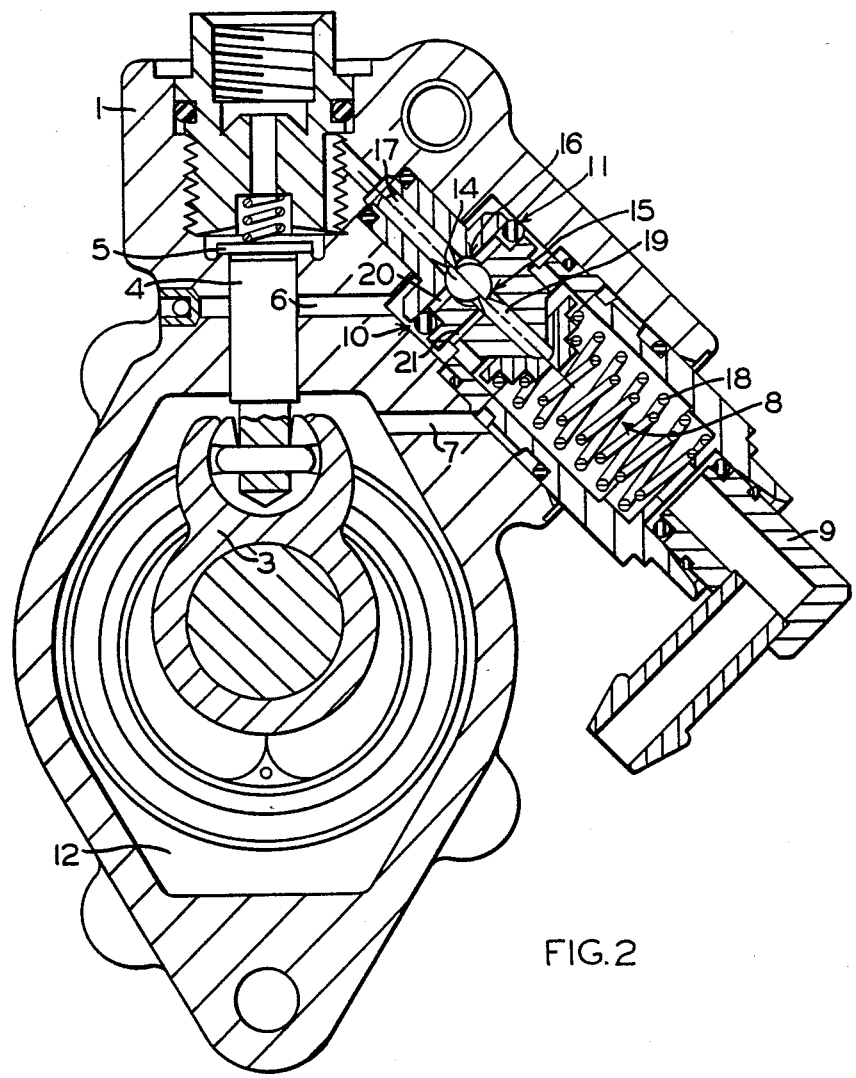
FIG. 2 is a cross-section taken on BB in FIG. 1.

FIG. 2 shows the unloader assembly 8 in which fluid from the system reservoir (not shown) enters the pump through the elbow 9 leading to the pump inlet port 6, having passed through the annulus at 10, which exists because an elastomeric o-ring seal 11 is under fitted in the bore housing the unloader by typically 0.5 mm. The reservoir fluid also freely enters the pump crankcase 12 through passage 7 for lubrication purposes (if the pump is adapted as a dual circuit unit then the crankcase is fed from one input only to avoid mixing of the circuits).

The pump shown is port inlet (it could of course be valve inlet). It fills its cylinder with fluid on the down stroke and pumps the fluid at pressure on the up stroke through the disc valve 5 and onto the circuit accumulators for storage at pressure.

To illustrate operation of the unloader, the drawing of FIG. 2 is split, the unloader assembly above the centerline being shown in the unloaded position (i.e. pump not delivering) and the unloader assembly below the centerline being shown in the loaded position (i.e. pump delivering). The chamber containing a valve ball 14 has two valve seats 15 and 16, the former typically being about 0.15 mm larger in diameter than the latter.

When the delivery pressure (i.e. accumulator pressure) is below the normal circuit operating value, the thrust developed by plunger 17 is insufficient to prevent springs 18 from seating the ball at 16 and seal ring 11 takes the retracted position shown (below the centerline) and admits fluid to the port 6 via annulus 10. When the delivered pressure reaches the predetermined operating value, the force on plunger 17 is sufficient to force the ball 14 against the spring load through pin 19 onto seat 15. Also due to controlled leakage past plunger 17 the delivery pressure acts through radial passages 20 to urge the o-ring seal 11 to expand radially into engagement with its bore thus preventing fluid passing to inlet port 6 via annulus 10, and terminating the pump delivery. The diametrical difference between seats 15 and 16 is to provide a specified pressure differential between cut-in and cut-out to avoid over sensitivity. The pressure in the pump inlet an port 6 is always low, so that when the pump is loading and pressure in passage 20 is released past seat 15 and along passage 21, the elastomeric properties of seal 16 returns it radially within its fitted leakproof gap to reopen the annulus 10, thereby accommodating fluid flow to port 6 and onto delivery.

The design gives a snap action in both directions to the fully open or closed positions, thereby eliminating any throttling of the inlet caused by the partial opening of conventional arrangements. This results in a quieter operation of the unloader function.

If a seal with insufficient elastomeric returning force is used, then a garter spring or other aid may be required to ensure its return.

I claim:

1. For use with a hydraulic pump having an inlet passage to which a source of fluid is connected, at least one piston, a delivery passage to which the fluid is pumped under pressure by said at least one piston, and an unloader device for limiting the pump delivery pressure to a predetermined value, said unloader device comprising:
   (a) a bore in the body of said pump via which the fluid from said source is connected to said inlet passage;
   (b) a cylindrical member in said bore;
   (c) an annular groove surrounding said cylindrical member;
   (d) an o-ring seal disposed in said groove in normally spaced relationship with said bore so as to provide an annulus past which the fluid from said source is free to flow to said inlet passage; and
   (e) valve means for connecting fluid under pressure from said delivery passage to said groove to effect radial expansion of said o-ring seal into sealing engagement with said bore when said delivery pressure exceeds said predetermined value and to thereby interrupt said flow of fluid from said source to said inlet passage.

2. An unloader device as recited in claim 1, wherein said cylindrical member includes:
   (a) a first passageway between said delivery passage and said inlet passage; and
   (b) a second passageway connecting said first passage and said annular groove.

3. An unloader device as recited in claim 2, wherein said valve means comprises:
   (a) a first valve seat in said first passageway on the delivery passage side of said connection of said second passage therewith;
   (b) a second valve seat in said first passageway on the inlet passage side of said connection of said second passage therewith;
   (c) a valve element operably disposed in said first passageway between said first and second valve seats;
   (d) bias means for urging said valve element into sealing engagement with said first valve seat to interrupt flow of fluid under pressure between said delivery passage and said groove; and
   (e) a plunger subject to said delivery fluid pressure and acting on said valve element in opposition to said bias means so as to unseat said valve element from said first valve seat and thereby establish said flow of fluid under pressure from said delivery passage to said groove when said delivery pressure exceeds said predetermined value.

4. An unloader deice as recited in claim 3, wherein said valve element is a ball valve.

5. An unloader device as recited in claim 4, wherein the diameter of said second valve seat is larger than said first valve seat.

6. An unloader device as recited in claim 4, wherein the effective pressure area of said ball valve when engaged with said second valve seat is greater than when engaged with said first valve seat.

* * * * *